Figure 1:
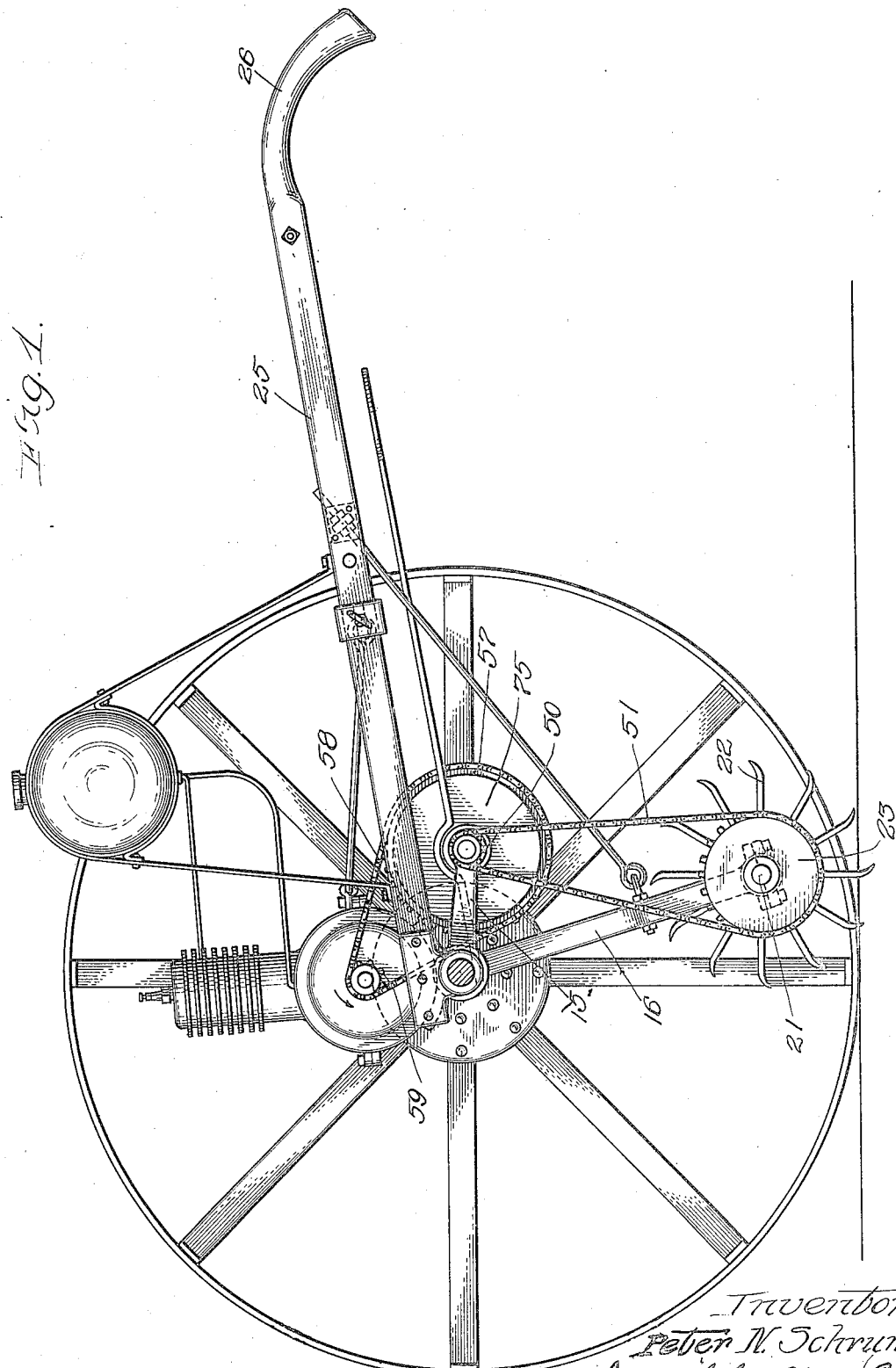

Feb. 6, 1923.                                         1,444,530.
P. N. SCHRUM.
CULTIVATOR.
FILED JAN. 16, 1922.                          2 SHEETS—SHEET 1.

Inventor,
Peter N. Schrum,

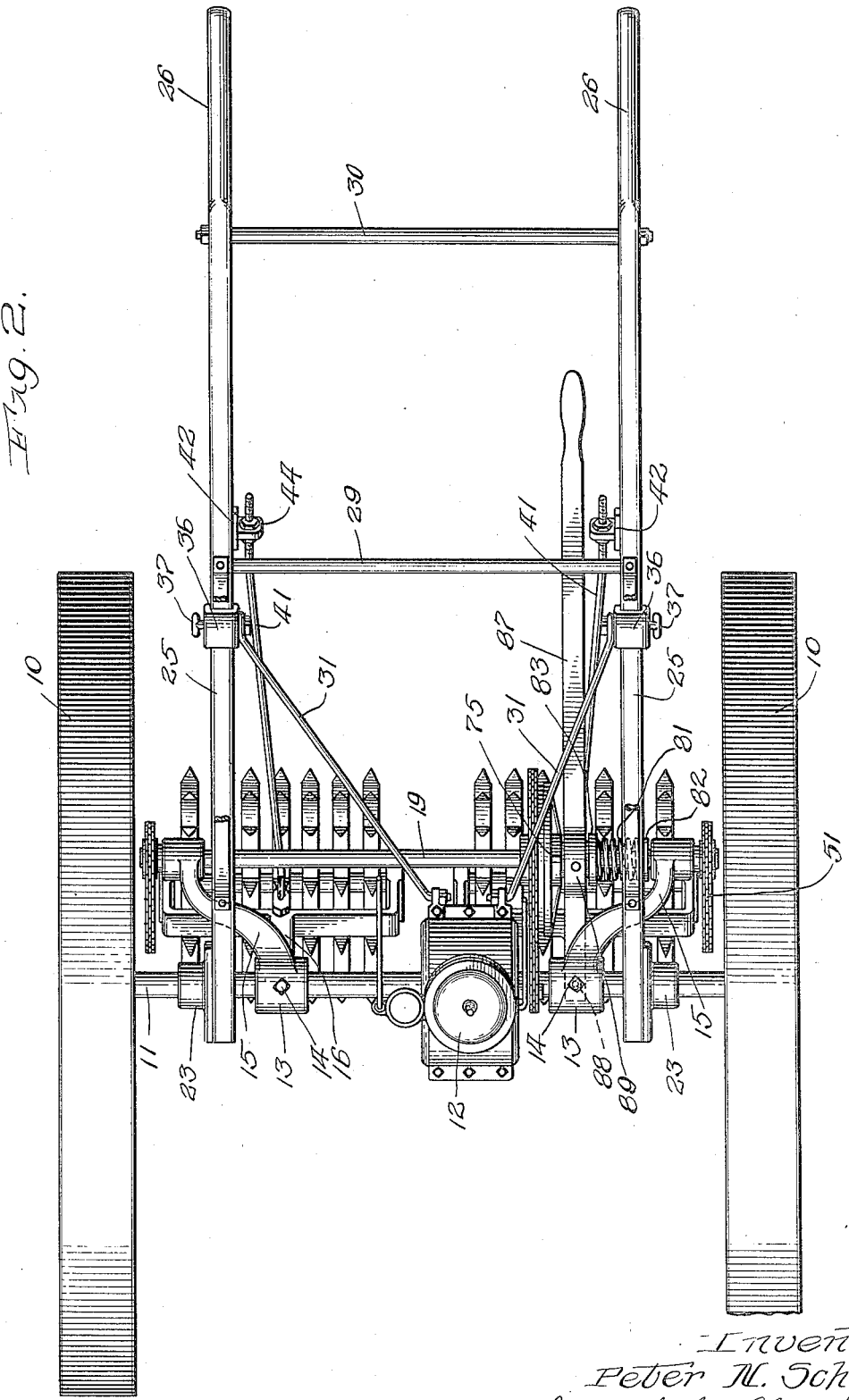

Patented Feb. 6, 1923.

1,444,530

UNITED STATES PATENT OFFICE.

PETER N. SCHRUM, OF LANSING, ILLINOIS.

CULTIVATOR.

Application filed January 16, 1922. Serial No. 529,493.

*To all whom it may concern:*

Be it known that I, PETER N. SCHRUM, a citizen of the United States, residing at Lansing, in the county of Cook and State of Illinois, have invented a new and useful Improvement in Cultivators, of which the following is a specification.

This invention relates to improvements in cultivators. My improved cultivator can be easily and cheaply made and is simple in construction. One of the principal features of my invention is the provision of means on the cultivator for operating the colters or cultivating tools in such a manner that such operation also serves to propel the device. Other features and advantages of my invention will appear more fully as I proceed with my specification.

A device embodying the features of my invention is shown in the accompanying drawings in which Figure 1 is a view and side elevation of a cultivator and Fig. 2 is a top plan view thereof.

As shown in the drawings, the cultivator comprises a pair of large supporting wheels 10 rotatably mounted on the ends of a stationary axle 11. Mounted on the axle in any suitable manner is a motor 12, which is here shown as of the internal combustion type. The axle 11 also carries two sleeves 13 held in position by the set screws 14. Each of the two sleeves 14 carries a rearwardly and outwardly extending arm 15 and a downwardly extending arm 16, the ends of the arms 15 carrying at their ends a rotatably supported counter shaft 19. The lower end of each of the arms 16 is bifurcated, and there is rotatably supported between the ends of each pair of arms thus formed a shaft 21 carrying the colters or cultivating tools. The outer ends of the two shafts 21 carry sprockets 23.

Rotatably mounted on the axle 11 are two flanged sleeves 23 to which are attached in any suitable manner the forward ends of two handles 25. The rearward ends of the handles 25 are provided with hand grips 26 adapted to be grasped by the operator. The handles 25 are suitably spaced apart and strengthened by cross members 29 and 30. The handles 25 are joined to the engine 12 by rods 31. Rods 31 are attached to the handles 25 by means of sleeves 36 provided with set-screws 37 permitting adjustment thereof. The handles 25 are also joined to the lower ends of the arm 16 by rods 41. The upper ends of the rods 41 are threaded and inserted through holes in members 42 fastened on the handles 25. The threaded ends of each of the rods 41 is provided with a pair of ends 44, one on each side of the member 42 in order to permit adjustment of the rod 41 with respect to the handle 25.

Each end of the counter shaft 19 carries a sprocket 50 joined by a chain 51 to the sprocket 23 on one of the colter shafts. The counter shaft 19 also carries a large sprocket 57 joined by a chain 58 to the small engine sprocket 59 which is adapted to rotate in the direction indicated by the arrow.

The sprocket 57 is loosely mounted on the counter shaft 19, and any suitable clutching mechanism may be provided for holding it against rotation on such shaft, so that as it is driven by the engine, it will rotate the counter shaft 19, which in turn operating through the two chains 51 will operate the two colter shafts 21 and thus drive the colters or cultivating tools 22. I have here shown, for example, such clutching mechanism as comprising a disk 75 slidably mounted on the counter shaft 19, but held against rotation thereon by any suitable means such as a spline. A spiral spring 81 operating against the collar 82, forces the disk 75 into frictional engagement with the sprocket 57, thus causing the sprocket to rotate the counter shaft 19. A grooved collar 83 is provided for the purpose of compressing the spring 81 to release the frictional engagement between disk 75 and sprocket 57 in order to free the sprocket on the counter shaft. The collar 83 is adapted to be operated by the lever 87 which is pivoted at 88 and provided with a bent portion 89 adapted to engage with the groove on the axle 83.

In operation, the engine 12 drives the colters 22 as described above; and the rotation of such colters operates to propel the machine forward. It will be noted that the direction is proper for this purpose. By raising or lowering the handles 26, the colters 22 may be made to engage the ground to the desired extent, thus giving the desired forward traction. The height of the handles 26 may be adjusted by changing the adjustment of the rods 31 and 41 as described above. If desired, the handles 26 may be raised sufficiently to lift the colters 22 entirely out of the ground, thus removing the tractive effort of the cultivator.

It will be noted that the cultivator tools engage the ground at a point substantially under the axle on which the tractor wheels are mounted. Because of this construction, the rotation of the cultivator tools not only serves to assist in propelling the machine forward, but also exerts a lifting effect on the device thus removing some of the weight from the tractor wheels and making propulsion of the machine easier.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A cultivator comprising a pair of supporting wheels mounted on an axle, rotatably mounted cultivator tools adapted to engage the ground at a point substantially below the axle, and independent power means carried by the cultivator for rotating the cultivator tools in a direction whereby their engagement with the ground will operate to propel the cultivator and exert a lifting effect.

2. A cultivator comprising a pair of tractor wheels mounted on an axle, rotatably mounted cultivator tools radially spaced from the axle to engage the ground at a point substantially below the axle, independent power means carried by the cultivator for rotating the cultivator tools in a direction whereby their engagement with the ground will operate to propel the cultivator, and exert a lifting effect, a radially arranged handle having one end attached to the axle, and means for varying the angularity between said handle and the cultivator tools.

3. A cultivator comprising a pair of tractor wheels mounted on an axle, rotatably mounted cultivator tools in a support radially spaced from the axle to engage the ground at a point substantially below the axle, independent power means carried by the cultivator for rotating the cultivator tools in a direction whereby their engagement with the ground will operate to propel the cultivator, and exert a lifting effect, a radially arranged handle having one end attached to the axle, and an adjustable brace connecting said handle and the support for the cultivator tools.

4. A cultivator comprising a pair of supporting wheels mounted on an axle, a depending arm having its upper end attached to the axle and its lower end bifurcated, cultivator tools rotatably mounted in the bifurcated end of said arm, a handle having one end attached to the axle, and means for varying the angularity between said arm and said handle.

5. A cultivator comprising a pair of supporting wheels mounted on an axle, a depending arm having its upper end attached to the axle and its lower end bifurcated, cultivator tools rotatably mounted in the bifurcated end of said arm, a handle having one end attached to the axle, and an adjustable brace connecting said arm and handle.

6. A cultivator comprising a pair of tractor wheels mounted on an axle, supporting means attached to said axle and carrying rotatably mounted cultivator tools, independent power means carried by the cultivator for rotating the cultivator tools in a direction whereby their engagement with the ground will operate to propel the cultivator, and exert a lifting effect and means for varying the angularity between the aforesaid supporting means for the cultivator tools and said handle.

7. A cultivator comprising a pair of tractor wheels mounted on an axle, supporting means attached to said axle and carrying rotatably mounted cultivator tools, independent power means carried by the cultivator for rotating the cultivator tools in a direction whereby their engagement with the ground will operate to propel the cultivator and exert a lifting effect, a handle having one end attached to said axle, and an adjustable brace connecting the aforesaid supporting means for the cultivator tools and said handle.

8. A cultivator comprising a pair of supporting wheels, mounted on an axle, bifurcated brackets supported by the axle, means for adjusting the bifurcated brackets in vertical and horizontal directions, cultivator tools rotatably mounted between the prongs of the bifurcated brackets, and means for rotating the cultivator tools in a direction whereby their engagement with the ground will exert a forward and upward pressure to carry a part of the load of the cultivator and propel the same forward.

In witness whereof I have hereunto set my hand and seal the 6th day of January, 1922.

PETER N. SCHRUM. [L. S.]